United States Patent
Franke et al.

(10) Patent No.: US 12,309,615 B2
(45) Date of Patent: *May 20, 2025

(54) BEAM MANAGEMENT METHODS AND APPARATUSES FOR POSITIONING MEASUREMENTS IN A COMMUNICATIONS NETWORK

(71) Applicant: KONINKLIJKE PHILIPS N.V., Eindhoven (NL)

(72) Inventors: Norbert Franke, Erlangen (DE); Marcus Grossman, Erlangen (DE); Markus Landmann, Erlangen (DE); Mohammad Alawieh, Erlangen (DE)

(73) Assignee: Koninklijke Philips N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 18/144,408

(22) Filed: May 8, 2023

(65) Prior Publication Data
US 2023/0276257 A1   Aug. 31, 2023

Related U.S. Application Data

(60) Continuation of application No. 17/890,545, filed on Aug. 18, 2022, now Pat. No. 11,689,938, which is a
(Continued)

(30) Foreign Application Priority Data

Nov. 1, 2018  (EP) .................................... 18203980

(51) Int. Cl.
*H04W 16/28*   (2009.01)
*H04B 7/08*    (2006.01)
(Continued)

(52) U.S. Cl.
CPC ............ *H04W 16/28* (2013.01); *H04B 7/086* (2013.01); *H04W 24/10* (2013.01); *H04W 72/23* (2023.01); *H04J 11/00* (2013.01); *H04L 5/0048* (2013.01)

(58) Field of Classification Search
CPC .. H04B 7/0695; H04B 7/0617; H04B 17/318; H04B 7/088; H04B 17/27; H04B 17/309;
(Continued)

(56) References Cited

U.S. PATENT DOCUMENTS 10,454,553 B2 * 10/2019 Agrawal ................. H04L 43/16
11,070,261 B2    7/2021 Lee
(Continued)

OTHER PUBLICATIONS

Written Opinion of the International Searching Authority, European Patent Office, dated Jan. 24, 2020.
(Continued)

*Primary Examiner* — Eva Y Puente

(57) ABSTRACT

The embodiments herein relate to method performed by a radio network node or a LMF, a method performed by a UE and a UE for downlink and uplink beam management for positioning measurements. The method comprising at least: configuring the target UE; receiving at least one report from the UE; exchanging the report(s) with neighboring network nodes and/or a location measurement function; providing instructions the UE; receiving at least one measurement report from the UE; and estimating the location of the UE using received information.

39 Claims, 7 Drawing Sheets

Related U.S. Application Data division of application No. 17/289,067, filed as application No. PCT/EP2019/079608 on Oct. 30, 2019, now Pat. No. 11,477,665.

(51) Int. Cl.

| | | |
|---|---|---|
| *H04W 24/10* | (2009.01) | |
| *H04W 72/23* | (2023.01) | |
| *H04J 11/00* | (2006.01) | |
| *H04L 5/00* | (2006.01) | |

(58) Field of Classification Search
CPC ... H04B 7/0626; H04B 7/0639; H04W 64/00; H04W 24/10; H04W 24/08; H04W 64/006; H04W 72/23; H04W 64/003; H04W 4/029; H04W 72/0446; H04L 5/0048; H04L 5/0051; H04L 5/0053; H04L 5/0094; H04L 5/0023; H04L 5/001; H04L 5/005; H04L 5/0007
USPC ........................................................ 375/262
See application file for complete search history.

(56) References Cited

U.S. PATENT DOCUMENTS

| | | |
|---|---|---|
| 2016/0080060 A1 | 3/2016 | Yu |
| 2017/0245165 A1 | 8/2017 | Onggosanusi |
| 2018/0062724 A1 | 3/2018 | Onggosanusi |
| 2018/0227031 A1 | 8/2018 | Guo |
| 2018/0279152 A1 | 9/2018 | Kim |
| 2019/0052330 A1 | 2/2019 | Kim |
| 2019/0090092 A1* | 3/2019 | Hwang ................ G01S 5/0215 |
| 2019/0281587 A1* | 9/2019 | Zhang ................... H04W 72/23 |
| 2019/0349060 A1 | 11/2019 | Liao |
| 2019/0372688 A1* | 12/2019 | Sadiq ................... H04B 17/318 |
| 2020/0052842 A1 | 2/2020 | Rico Alvarino |
| 2020/0305088 A1* | 9/2020 | Nory ..................... H04W 56/001 |
| 2021/0099992 A1 | 4/2021 | Mao |

OTHER PUBLICATIONS

3rd Generation Partnership Project; Technical Specification Group Radio Access Network; NR; Requirements for Support of Radio Resource Managment (Release 15), 3GPP Standard; Technical Specification; 3GPP TS 38.133, 3rd Generation Partnership Project (3GPP), Mobile Competence Centre; 650, Route Des Lucioles; F-06921 Sophia-Antipolis Cedex; France, vol. RAN WG4, No. V15.3.0, Oct. 3, 2018, pp. 1-136, XP051487579.

* cited by examiner

BEAM MANAGEMENT METHODS AND APPARATUSES FOR POSITIONING MEASUREMENTS IN A COMMUNICATIONS NETWORK

CROSS-REFERENCE TO RELATED APPLICATION

This application is a continuation of U.S. application Ser. No. 17/890,545 filed Aug. 18, 2022 which is a divisional of US national stage patent application Ser. No. 17/289,067, filed on Apr. 27, 2021, filed under 35 U.S.C. § 371, and of International Patent Application No. PCT/EP2019/079608 filed on Oct. 30, 2019, which claims priority to European Patent Application 18203980.0, filed on Nov. 1, 2018, each of which is incorporated by reference herein in their entirety.

TECHNICAL FIELD

The present disclosure relates to the field of wireless communications, and in particular to beam management methods and apparatuses for downlink and uplink positioning measurements in a communications network.

BACKGROUND

Beamforming is a crucial part of the third Generation Partnership Project (3GPP) Release (Rel.) 15 which defines a New Radio (NR) access technology that enables a radio base station (also denoted herein gNB) and a User Equipment (UE) to establish and adapt communication links using spatially precoded pilot signals. The beam management framework for positioning purposes is disclosed for the Downlink (DL) and the Uplink (UL), followed by a description on the issues or drawbacks to be addressed, but first a general discussion on the status in the 5th 3GPP mobile network (SG)).

Currently, for the 5G mobile network, 3GPP discusses how to integrate new (Radio Access Technology) RAT-dependent measurement mechanisms and schemes in its new 5G air interface New Radio (NR) in order to support own 5G NR positioning solutions.

Existing positioning solutions for e.g. the 4G 3GPP mobile network, also known as Long Term Evolution (LTE) are the starting point of the discussion. LTE was using eCID (enhanced Cell ID) exploiting measurements that were existing for communications anywhere which may include: cell knowledge, signal strength (e.g. Reference Signal Received Power or RSRP), antenna sector information, etc. and downlink-based Observed Time Difference Of Arrival (OTDOA) and Uplink-Time Difference of Arrival (UTDOA)-based schemes.

For Time Difference Of Arrival (TDOA) schemes in general, reference signals are usually exploited. Examples of reference signals include: Positioning Reference Signals (PRS) in the downlink and Sounding Reference Signal (SRS) in the uplink. In LTE solutions, these reference signals were not used in a beamformed scenario. For 5G and the 5G air interface New Radio (NR), in principle all signals are transmitted within rather complex, but useful, beamforming schemes.

DL and UL positioning is based on measurements of TDOA received from a User Equipment (UE) with respect to pairs of cells/gNBs. By a cell or a gNB is meant a radio base station or a network node covering a cell. The Time Of Arrival (TOA) estimates of signals are based on measurements per cell on reference signals. Such reference signals may be either existing reference signals in NR (e.g., such as Channel State Information Reference Signals (CSI-RS) and/or SS/PBCH block in the DL and SRS in the UL) and/or new reference signals solely dedicated for positioning such as Positioning Reference Signal (PRS) (which are, as far as the inventors knowledge, not defined in the current 3GPP Release (Rel-15) specification). SS Block (SSB) stands for Synchronization Signal Block and in reality, it refers to a Synchronization/PBCH block because a Synchronization signal and a PBCH channel may be packed as a single block that always moves together. The components of this block are as follows:

Synchronization Signal: PSS (Primary Synchronization Signal), SSS (Secondary Synchronization Signal);
PBCH: PBCH DMRS (DeModulation Reference Signal) and PBCH (Data)

In LTE, the transmission of PRS for OTDOA (and the reception of SRS for UTDOA) was defined in the 3GPP standard. In the case of PRS, these transmissions were broadcasted as "always-on" signals that were never intended for transmission in a beamformed fashion.

In other words, the problem of establishing UE specific beams originating from several locally distributed Transmission Points (TPs) in a coordinated fashion in order to support the joint task of 2-Dimensional/3-Dimensional (2D/3D)-positioning did not occur. A gNB may be viewed as a TP.

During the definition of NR Phase 1 (Rel. 15), beamforming schemes were mainly developed to pair single gNBs (or single TPs) with UEs. Now, at the beginning of the 3GPP Rel. 16, initial discussions on how to organize multipoint beamforming coordination just commenced. In Rel. 16, within the NR Positioning Study Items (PSI), discussions are planned to take place soon on how to embed TDOA schemes in the existing beamforming framework (that may be extended for this purpose) and there have not been prior discussions on that as far as the inventors are aware of.

SUMMARY

In order to move forward with RAT-dependent positioning solutions embedded in NR, the exemplary embodiments herein present and disclose at least potential schemes and scenarios on how to combine positioning reference signal transmission in both DL and UL directions including all details necessary to integrate with beam management and beamforming (including signaling).

It is thus an object of embodiments herein to provide beam management methods and apparatuses for positioning purposes or for positioning measurements in a communications mobile network that employs beamforming.

According to an aspect of embodiments herein, there is provided a beam management method performed by a (radio) network node (or s-gNB) or a Location Management Function (LMF) in a communication network comprising a target UE and at least one neighboring network node, n-gNB, neighboring said s-gNB. The method comprising: configuring the target UE with at least one reference signal (RS) resource setting containing a configuration of a number of resource sets, wherein each resource set contains at least one RS resource, associated with at least one neighboring radio network node (n-gNB) or s-gNB, wherein each configuration contains information on a time and a frequency location behavior of said least received RS resource associated with said at least one n-gNB o s-gNB, and wherein each RS resource is transmitted from an associated n-gNB or s-gNB employing beamforming, and received by UE. An example of a RS resource may be a synchronization signal block (SSB) resource or a positioning reference signal (PRS) resource. The method further comprising: configuring the target UE with at least one Channel State Information (CSI) reporting setting to provide instructions to the target UE on when and how to report, on said configured RS resources associated with respective n-gNB; at least a measurement information beam report; receiving at least one beam report from the target UE; exchanging said at least one beam report with at least one n-gNB (LMF). For example, in case the LMF is the coordinating node the LMF informs the gNB(s) with at least one resource configuration e.g. a PRS configuration.

The method further comprising configuring the target UE with at least one PRS resource set configuration; configuring at least one CSI reporting setting to provide instructions to the target UE on when to perform at least one beam measurement and at least one measurement on Time-Of-Arrival (TOA) parameter or Reference Signal Time Difference (RSTD) parameter or Round Trip Time (RTT) parameter of the configured PRS and/or SS/PBCH block resources and how to report these parameters; receiving, from the target UE, at least one measurement beam report including at least one value of each identified beam-ID along with an associated signal strength/quality indicator and one or several TOA or RSTD or RTT estimates associated with each received DL beam; and estimating the location of the target UE using at least the received measurement beam report received from the target UE.

According to another aspect of embodiments herein, there is also provided an apparatus in the form of a (radio) network node (or s-gNB) or LMF for beam management, the network node comprising a processor and a memory, said memory containing instructions executable by said processor whereby said network node is operative to perform the subject matter disclosed herein.

There is also provided a computer program comprising instructions which when executed on at least one processor of the network node, cause the at least said one processor to carry out the method according to the subject matter disclosed herein.

A carrier containing the computer program, wherein the carrier is one of a computer readable storage medium; an electronic signal, optical signal or a radio signal.

There is also provided a method performed by a (target) UE, for beam management, the UE being served by a radio network node, s-gNB, in a communications network comprising at least said s-gNB and at least one neighboring network node, n-gNB, neighboring said s-gNB the method comprising:

receiving, from a network node, a configuration message for configuring the UE with at least one reference signal (RS) resource setting (e.g. at least one synchronization signal block resource setting or a PRS resource setting) containing a configuration of a number of resource sets, wherein each recourse set containing at least one RS resource, associated with at least one n-gNB, wherein each configuration contains information on a time and a frequency location behavior of said least one received RS resource associated with a n-gNB and wherein each RS resource is transmitted from an associated n-gNB employing beamforming, and received by the UE; receiving, from the network node, a configuration message for configuring the UE with at least one Channel State Information (CSI) reporting setting providing instructions to the UE on when and how to report, on said configured RS resources associated with respective gNB; at least a measurement information beam report; transmitting to the network node at least one beam report;

receiving, from the network node a configuration message for configuring the UE with at least one PRS resource set configuration;

receiving from the network node a configuration for configuring at least one CSI reporting setting to provide instructions to the target UE on when to perform at least one beam measurement and at least one measurement on Time-Of-Arrival, TOA, parameter or Reference Signal Time Difference, RSTD, parameter or Round Trip Time, RTT, parameter of the configured PRS and/or RS resources and how to
report these parameters;

performing TOA (or RSTD and/or RTT) measurements on the received DL RS (PRS, RS, CSI-RS, SSB) beams and providing at least one beam report to the s-gNB or the LMF; and transmitting to the network node or s-gNB or LMF that least said measurement beam report including at least one value of each identified beam-ID along with an associated signal strength/quality indicator and one or several TOA or RSTD or RTT estimates associated with each received DL beam.

According to another aspect of embodiments herein, there is also provided a UE (e.g. a target UE) for beam management, the UE comprising a processor and a memory, said memory containing instructions executable by said processor whereby said UE is operative to perform the subject-matter disclosed herein.

There is also provided a computer program comprising instructions which when executed on at least one processor of the UE, cause the at least said one processor to carry out the method according to the subject-matter disclosed herein.

A carrier is also provided containing the computer program, wherein the carrier is one of a computer readable storage medium; an electronic signal, optical signal or a radio signal.

There is also provided a Location and Measurement Function residing in any suitable network node for DL and UL beam management for positioning measurements as clear from the detailed description. Many of the functions performed by the radio network node above may be performed by the LMF as will be readily clear from the detailed description.

An advantage with embodiments herein is to introduce new useful schemes for mobile networks employing beamforming, on how to combine positioning reference signal transmission in both downlink and uplink directions with all details necessary to integrate with beam management and beamforming (including signaling).

Another advantage is that by configuring UE with at least one RS resource setting (e.g. synchronization resource block setting or PRS resource setting) of at least one neighboring network node (n-gNB), the UE does not need to blindly detect said resource block of said at least one n-gNB.

Therefore, by exploiting the a priori knowledge of synchronization signal resource block(s) of each neighboring n-gNBs which are each involved in the method herein, the overall synchronization signal block detection complexity at the UE is reduced and the detection performance is improved.

In addition, the amount of signaling is reduced since the UE knows when to perform the detection.

Another advantage with some embodiments herein is to reduce the feedback overhead by grouping DL SSB beams (ssb-Index values as will be exemplified) reported with respect to the gNB index they are associated with.

BRIEF DESCRIPTION OF THE DRAWINGS

Examples of embodiments and advantages of the embodiments herein are described in more detail with reference to attached drawings in which.

DETAILED DESCRIPTION

In the following, is presented a detailed description of the exemplary embodiments in conjunction with the drawings, in several scenarios, to enable easier understanding of the solution(s) described herein.

It should be emphasized that a panel discussed throughout this disclosure may be associated with at least one antenna port. Below are some examples demonstrating that where basically a panel may be associated with more than an antenna port, for example a set of antenna ports. Note that a panel may be associated with any number of antenna ports, 1, 2, 3, 4, . . . , 64, etc. and the embodiments herein are not restricted to any particular number of antenna ports associated with a panel. Generally, the number of antenna ports is a design parameter depending on cost, size, complexity of a UE with such a panel or antenna ports.

In the following description, a UE may be assumed to be in a Radio Resource Control (RRC) connected mode and the beam management procedure with a serving network node or service gNB (s-gNB) (initial beam acquisition and beam refinement) is accomplished.

The following disclosure according to exemplary embodiments herein describes an extension of the current 3GPP Release-15 beam-reporting scheme (see [2]) to facilitate DL and UL beam reporting in combination with position-related parameters reporting over multiple cells or multiple network nodes or TPs.

In the following description, CSI-RS is considered as an example of a positioning reference signal. Note however that the present disclosure is not in any way restricted to CSI-RS, instead CSI-RS may also be replaced by any other reference signal as such TRS (CSI-RS for Tracking) or PT-RS (Phase Tracking Reference Signal), PRS or any suitable positioning reference signal currently known and also not yet defined positioning reference signals.

Figure 1:
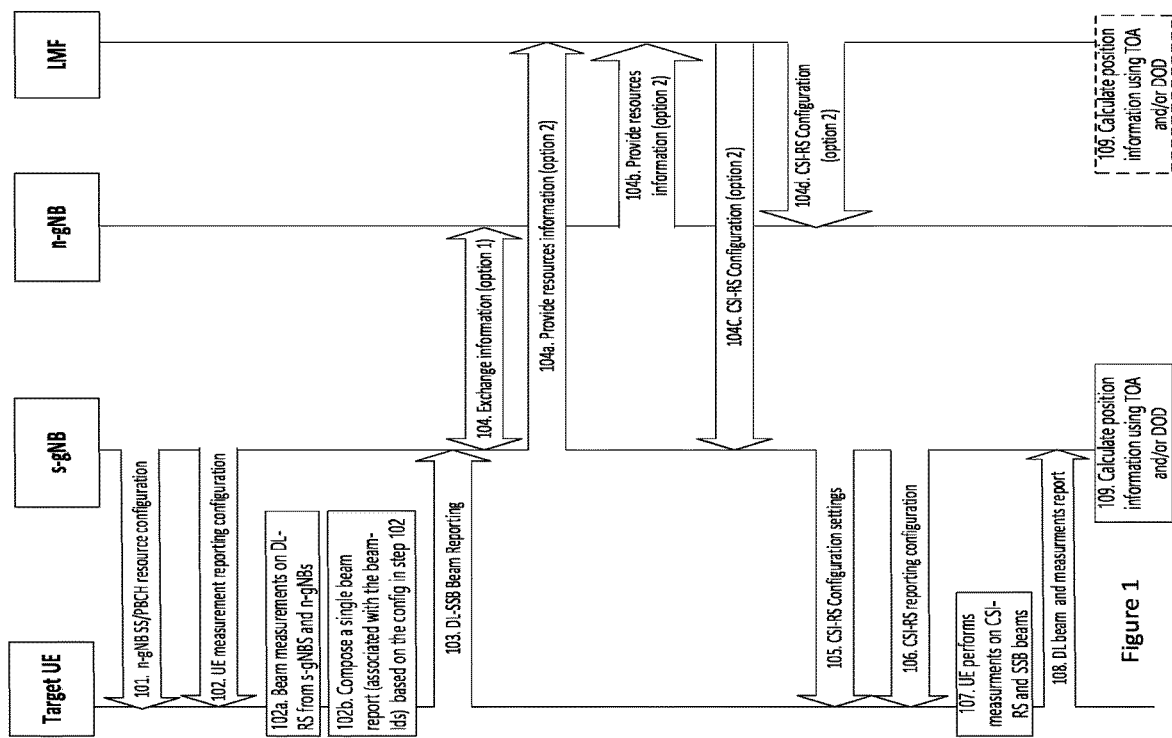
FIG. 1 depicts an example of a signaling flow diagram according to exemplary embodiments herein.

Before summarizing the main procedural steps employed by the exemplary embodiments herein, a scenario 100 depicting an example of a signaling flow diagram according to exemplary embodiments herein is first presented with reference to FIG. 1 depicting an exemplary beam management procedure.

As shown, the different entities that may be employed are a UE (or a target UE), a serving network node (s-gNB), at least one neighboring radio network node (n-gNB) and a Location Measurement Function (LMF) which can reside anywhere in the network and may be integral or internal part of any suitable network node (e.g. a gNB or a server etc.). In the example of FIG. 1, a reference signal such as the SS/PBCH synchronization signal (or SSB) is used, although as mentioned earlier, the embodiments are not restricted to SS/PBCH. For example, the embodiments herein may employ the PRS signal instead of the SSB. The example is only presented for facilitating and allowing the skilled reader to understand how the exemplary embodiments herein may be employed.

In FIG. 1, the following referrals referring to the different signals and/or functions are used and highlighted below:

101. Signaling of SS/PBCH Block Resource Settings of Neighboring Cells

The s-gNB is adapted to configure the target UE with at least one synchronization signal (e.g. SS/PBCH) block resource settings via higher layer signaling (RRC) containing a configuration of a number of SS/PBCH block sets associated with at least one n-gNB. Each configuration contains information on the time and frequency behavior of the SS/PBCH block resource associated with the n-gNB. The configuration may contain information on the time and frequency location of each configured SS/PBCH block resource, the SS/PBCH block resource bandwidth, periodicity, Primary Cell Identifier (PCI), SS/PBCH block index, and several higher layer parameters [3]. Each configured SS/PBCH block resource set may contain one or more SS/PBCH block resources and may be associated to a specific n-gNB. The SS/PBCH block resource typically comprises a Primary Synchronization Signal (PSS), a Secondary Synchronization Signal (SSS), the PBCH, and at least a PBCH-DMRS.

Configuring the target UE with the SS/PBCH block resource settings of the n-gNBs has the advantage that the UE does not need to detect blindly the SS/PBCH block resources of the n-gNBs. Therefore, by exploiting the a priori knowledge of the SS/PBCH block resources of the n-gNBs, the overall SS/PBCH block detection complexity at the UE is reduced and the detection performance is improved. In addition, the amount of signaling is reduced since the UE knows when to perform the detection. Again, the embodiments herein are not restricted to SS/PBCH meaning that the advantages presented above are also achieved when other type of synchronization signal blocks or reference signals such as PRS are used.

The DL SS/PBCH block reference signals contained in a SS/PBCH block resource are typically transmitted by each n-gNB using a beamforming operation or employing beamforming to achieve certain spatial coverage. Each SS/PBCH block resource may therefore be associated with a DL SSB transmission beam.

In the context of beamforming, the DL SSB transmission beams may be Time Division Multiplexed (TOM) in different symbol periods or slots of a sub frame (see [1]). For example, the first DL SSB beam may be transmitted in a first symbol period; the second DL SSB beam may be transmitted in a second symbol period; and so on. A SSB transmitted using a beam is referred to here as a SSB beam.

Referring back to FIG. 1, the signaling diagram further comprises:

102 Signaling of Reporting Quantities for DL Beam Report

The serving network node, s-gNB, is adapted to configure the UE with one or several higher-layer CSI reporting settings to provide instructions (triggering conditions and reporting quantities) to the UE on when and how to report measurement information on the configured SSB beams (SS/PBCH block resources) associated with respective n-gNB. The list of CSI quantities the UE has to report may follow the ReportQuantity as a part of ReportConfig [2]. The report quantity configured at the UE is either RSRP or Signal to Interference Noise Ratio (SINR) or any suitable quantity that may be used to measure the quality of a signal.

According to an exemplary embodiment, the following new options are added to values of the higher-layer parameter ReportQuantity [2]:

gNB-Index-ssb-Index-RSRP (or gNB-Index-RS-RSRP), and/or gNB-Index-ssb-Index-SINR (or gNB-Index-RS-SINR)

Moreover, the s-gNB may configure the UE with group-based or non-group-based beam reporting for reporting the information of the received SSB beams from the different n-gNBs. In case of group-based beam reporting, the UE reports gNB-ID and beam-ID values associated with a single and/or different n-gNBs that may be received simultaneously by the UE with the same setting of the Receiver (Rx) spatial filters (i.e., the same receive beam(s)). In case of non-group-based beam reporting, the UE reports a total of beam-IDs without taking into account if the SSB resources reported may be received simultaneously or not.

103. DL Beam Reporting on Received DL RS (SSB, CSI-RS) Beams Over Multiple gNBs The target UE is configured to perform measurements on the DL SSB beams transmitted by the n-gNB, and/or the DL RS (SSB and/or CSI-RS) beams transmitted by the s-gNB. After the beam measurements, the target UE is configured to provide at least one report or a single or multiple beam report(s) to the s-gNB and/or the Location Measurement Function (LMF). The UE can provide the beam report to the LMF within a location measurements transaction in the NR positioning protocol (NPP). The beam report contains at least a gNB identifier, a beam-identifier and a measure of the signal quality corresponding to the received DL beam associated with a configured SS/PBCH block resource or CSI-RS resource or PRS resource at the UE. The strength/quality measure may be the SINR or an RSRP (as configured in step 102). In the case that RSRP is configured, the UE reports the RSRP of the DL beams received at one or multiple UE antenna arrays (array panels or antenna ports). The beam report then includes at least one set of (gNB-ID (gNB-IDentifier), beam-ID, RSRP etc.) with respect to the received SSB beams and sets of (beam-ID, RSRP) with respect to the received CSI-RS beams associated with the s-gNB. For example, the beam report with respect of the received SSB beams is given by the following sets:

(gNB-Index #1, ssb-Index #1, RSRP #1), (gNB-Index #1, ssb-Index #2, RSRP #2), (gNB-Index #2, ssb-Index #3, RSRP #3), (gNB-Index #N, ssb-Index #L, RSRP #L).

and the beam report with respect to the received CSI-RS beams may be given by the following sets:

(CRI #P, RSRP #P), (CRI #P+K, RSRP #P+K), wherein CRI stands for CSI-RS Resource Indicator.

Here, the gNB-Index refers to a unique identifier associated with a n-gNB. The gNB-Index may be either a new index assigned by the s-gNB, or an existing one such as the primary cell identifier.

In case of SINR, the UE may report the SINR of the DL SSB beams from the s-gNB and n-gNBs, where the SINR with respect to the k-th received SSB beam is given by $$\text{SINR}(SSBID\ k) = \frac{P_k}{\sum_{j \neq i} P_j + N_0}$$

where $P_k$ denotes the received signal power of the k-th received SSB beam; SSBID_k, $\Sigma_{j \neq i} P_k$ denotes the total received power of all received DL SSB beams configured on the same time/frequency resource, expect the k-th received DL beam, and No denotes the noise. Similarly, in case of configured CSI-RS, the UE reports the SINR of the received DL CSI-RS beams, where the SINR with respect to the k-th received CSI-RS beam is given by:

$$\text{SINR}(CRI\ k) = \frac{\bar{P}_k}{\sum_{j \neq i} \bar{P}_j + N_0}$$

where $\bar{P}_k$ denotes the received signal power of the k-th received CSI-RS beam CRI k, and $\Sigma_{j \neq i} \bar{P}_j$ denotes the total received power of all received DL CSI-RS beams from the s-gNB configured on the same time/frequency resource, expect the k-th received DL CSI-RS beam.

The beam report may then include sets of (gNB-ID, beam-ID, SINR) with respect to the received SSB beams and sets of (beam-ID, SINR) with respect to the received CSI-RS beams associated with the s-gNB, e.g., (gNB-Index #1, ssb-Index #1, SINR #1), (gNB-Index #1, ssb-Index #2, SINR #2), (gNB-Index #2, ssb-Index #3, SINR #3), (gNB-Index #N, ssb-Index #L, SINR #L), (CRI #P, SINR #P), (CRI #P+K, SINR #P+K).

For beam reporting, N out of K DL SSB beams (N<K) reported may be associated with the same gNB (i.e., the same gNB index). In order to reduce the feedback overhead, the DL SSB beams (ssb-Index values) reported may be grouped with respect to the gNB-Index they are associated with. Consequently, less signaling is achieved which is greatly appreciated in mobile networks. This means, instead of reporting for the N DL beams (which are associated with the same gNB) N times the same gNB-Index, only a single gNB-Index may be reported for those DL beams. If a number of received DL beams (ssb-Index values) have a common gNB-Index, the DL beams (ssb-indices) may be grouped in the report as follows:

gNB-Index #1:
  ssb-Index #1, SINR #1,
  ssb-Index #2, SINR #2,
gNB-Index #2:
  ssb-Index #L, SINR #L,
  ssb-Index #L+1, SINR #L+1,

104 Exchange of DL Beam Report Information Between s-gNB and n-gNBs and Coordination of CSI-RS The LMF is configured to collect the information reported from UE beam report via the s-gNB. The s-gNB exchanges the information on the reported SSB and CSI-RS beams from the UE with the surrounding n-gNBs via a backhaul (e.g., Xn) interface assuming that the s-gNB and the n-gNBs are interconnected with each other or the LMF provides these information over the NPPa protocol (NR Positioning Protocol A) (between the LMF server/function and the gNBs). In case the LMF is the coordinating unit/node it informs the gNB(s) with at least one resource configuration (e.g. PRS configuration)

Two exemplary embodiments may be applied for the exchange of the UE beam reporting information as shown in FIG. 1:

(104) The s-gNB may provide the full DL beam report received from the UE to the surrounding n-gNBs, or it may provide the full DL beam report to a subset of selected n-gNBs, or it may only provide a partial DL beam report to selected n-gNBs. For example, the partial beam report may only contain information on the received DL beam(s) at the UE associated with an n-gNB, or it may contain only the strongest DL beam associated with the n-gNB. The strongest DL beam may be the DL beam associated with the highest RSRP or SINR.

(104*a*) The s-gNB may provide said information to the LMF or a server or network node implementing the function of the LMF. The LMF may use the information based on the beam report (UE<->gNB) to assign the beam pairs and time/frequency resources. The coordination at LMF may take resources allocation constraints from the gNBs involved in the positioning and the interference to assign these resources:

The LMF may identify the best (relevant) gNBs for the positioning session based on the signal quality or based on geometry information (for TDOA the deployment geometry is needed to get a valid position).

If available, the LMF may use either the information provided by the gNBs together with the interference conditions to determine a CSI-RS resource setting, or it may inform the gNBs with possible CSI-RS settings and the associated gNBs acknowledge or may request a new CSI-RS configuration. The information from each gNB to LMF may be signaled over the NRPPa interface (disclosed in the 3GPP standard related document 3GPP TS 38.455) and may include information on:

(1) reserved resources for positioning, (2) available single or multiple resources that can be used with the next sub-frames.

The LMF may use the information in (1) and (2) to assign positioning DL-RS resources (3) the LMF may request for interference coordination from the gNBs information on scheduled traffic on the time-frequency resources allocated for positioning.

The LMF may also forward the report to the s-gNB and n-gNBs as stated in (104). The LMF or the s-gNB may coordinate the CSI-RS resource configuration setting for the s-gNB and the n-gNBs.

Each CSI-RS resource setting is used at the s-gNB and/or n-gNB to generate a set of DL CSI-RS beams. The CSI-RS resources transmitted by different gNBs shall be orthogonal or quasi-orthogonal to each other (by employing FDM (Frequency Division Multiplexing), TOM and/or COM (Code Division Multiplexing)) in order to reduce the interferences at the UE caused by the different DL CSI-RS beams from the n-gNBs and s-gNB.

The s-gNB may also request a CSI-RS configuration setting only from selected n-gNBs. The request may contain for each n-gNB a number of CSI-RS resources/CSI-RS resource sets with frequency-domain behavior, periodicity, etc.

In response, each n-gNB may provide a specific CSI-RS resource setting containing information on the time and frequency location and behavior (periodicity, mapping type such as COM-type, number of CSI-RS ports, beam-ID (CRI), etc. (see section 5.2.2.3 of the 3GPPP TS 38.214)) of each CSI-RS resource/CSI-RS resource set to the s-gNB.

A n-gNB may also reject the CSI-RS configuration request from the s-gNB. In such a case, the s-gNB may not provide a CSI-RS resource setting with respect to that n-gNB to the UE.

105. Configuration of CSI-RS Configuration with Respect to Neighboring Cells The s-gNB is adapted to configure the UE with the one or multiple CSI-RS resource set configurations or PRS resource configuration. Each CSI-RS resource set may contain one or more CSI-RS resources associated with an n-gNB or s-gNB. Similar to the SS/PBCH block resource, each CSI-RS resource may be transmitted by each gNB using a beamforming operation. Each CSI-RS resource may therefore be associated with a DL CSI-RS transmission beam transmitted either by the s-gNB or an n-gNB.

106. Configuration of CSI-RS Reporting Quantity

The s-gNB is further adapted to configure one or several higher-layer CSI reporting settings to provide instructions to the UE on when to perform beam measurements and measurements on Time-Of-Arrival (TOA), Reference Signal Time Difference (RSTD), or RTT of the configured CSI-RS and/or SS/PBCH block resources and how to report these parameters.

The configured reporting quantity contains the RSRP or SINR, and the parameters related to positioning-based measurements such as TOA, or RSTD or RTT. The exact parameter to be configured depends on the applied positioning method (like OTDOA or RTT).

In addition, the UE may be configured with multiple TOA reporting per DL beam. The UE may also report the set of TOA values relative to the first or strongest TOA value.

In addition to the above-mentioned reporting quantities, the UE may also be configured to report the directional Sector-of-Arrival (SoA) a TOA estimate or a set of TOA estimates is associated with. The information about the SoAs may help to distinguish between TOAs received under Line-of-Sight (LOS) conditions and TOAs received under Non-Line-Of-Sight (NLOS) conditions at the UE. Such a distinction may help the LMF to improve the position estimation. The SoAs may be distributed over a sphere and a correspondence of each SoA to a specific angular (azimuth and elevation) range in a local coordinate system of the UE may be assumed.

Figure 2:
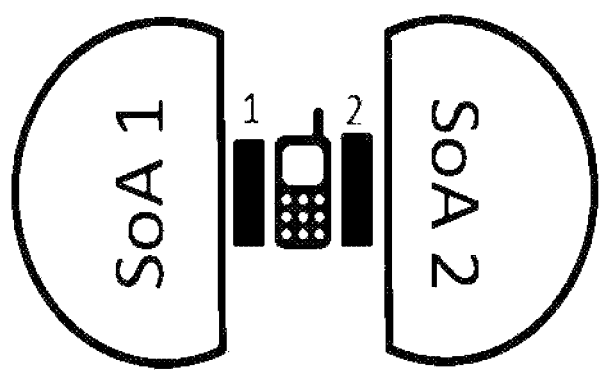
FIG. 2 depicts an example of a UE equipped with two panels or antenna ports, which may be used in a communication network employing embodiments herein.

The SoAs may correspond to the angular coverage areas of the UE panels. For example, when the UE is equipped with 2 panels and the antenna array pattern of each panel covers a half-sphere (upper and lower half-sphere), the first SoA is associated with the upper half-sphere and the second SoA is associated with the lower half-sphere. FIG. 2 shows an exemplary the case of 2 SoAs which are projected to a plane. For UL SoA, the LMF or the s-gNB may request the UE capability on the supported receiver antenna ports.

The SoAs may also correspond to the angular coverage areas of the UE received (Rx) beams. The beam pattern of each Rx beam at the UE is typically associated with a specific angular coverage area. Therefore, each Rx beam or a set of Rx beams may be associated with a single SoA.

107. DL Beam and TOA Measurement Report

The UE may be configured to perform TOA (or RSTD and/or RTT) measurements on the received DL RS (CSI-RS, SSB) beams and is configured to provide a beam report to the s-gNB or the LMF. The beam report contains values of the beam-IDs along with an associated signal strength/quality indicator and one or several TOA estimates associated with a received DL beam.

The beam report may contain sets of (beam-ID, RSRP or SINR, TOA(s)). For example, the beam report related to the configured CSI-RS resources may contain N sets.

(CRI #1: RSRP or SINR #1, TOA_1 #1, TOA_2 #1, TOA_3 #1), (CRI #N: RSRP or SINR #N, TOA_1 #N, TOA_2 #N, TOA_3 #N), where TOA_1 #n, TOA_2 #n and TOA_3 #n refers to three TOA values associated with the DL beam having beam-ID #n. The first TOA estimate TOA_1 #n may be associated with the strongest path component of the DL beam. The second TOA_2 #n may be associated with the second strongest path component of the DL beam and so on.

Similarly, the beam report related to the configured SS/PBCH block resources may contain N sets:

(gNB-ID #1, ssb-Index #1: RSRP or SINR #1, TOA_1 #1, TOA_2 #1, TOA_3 #1), (gNB-ID #K, ssb-Index #N: RSRP or SINR #N, TOA_1 #N, TOA_2 #N, TOA_3 #N), where TOA_1 #n, TOA_2 #n and TOA_3 #n refers to three TOA estimates associated with the DL beam having beam-ID #n.

In order to reduce the feedback overhead, the DL SSB beams (ssb-Index values) reported may also be grouped with respect to the gNB-Index they are associated with. This means, instead of reporting for the N DL beams (which are associated with the same gNB) N times the same gNB-Index, only a single gNB-Index is reported for those DL beams. If a number of received DL beams (ssb-Index values) have a common gNB-Index, the DL beams (ssb-indices) may be grouped in the report as follows:

gNB-Index #1:
  ssb-Index #1, SINR #1, TOA_1 #1, TOA_2 #1, TOA_3 #1
  ssb-Index #2, SINR #2, TOA_1 #2, TOA_2 #2, TOA_3 #2
gNB-Index #2:
  ssb-Index #L, SINR #L, TOA_1 #L, TOA_2 #L, TOA_3 #L
  ssb-Index #L+1, SINR #L+1, TOA_1 #L+1, TOA_2 #L+1, TOA_3 #L+1

If SoA is configured, the beam report may contain additional information on the received SoAs for each ToA estimate. The beam report may then contain multiple sets of (ToA, SoA):

(beam-ID #1: RSRP or SINR #1, (TOA_1 #1, SOA_1 #1), (TOA_2 #1, SOA_2 #1), (TOA_2 #1, SOA_3 #1))

(beam-ID #2: RSRP or SINR #2, (TOA_1 #2, SOA_1 #2), (TOA_2 #2, SOA_2 #2), (TOA_2 #2, SOA_3 #2))

108. Calculation of UE Position Using TOA and DOD Information (if Available)

The LMF or the s-gNB may use the beam report provided by the UE to estimate the UE's location. For the location estimation, the LMF (or the s-gNB) may use the one or more TOA estimates associated with a beam, the TOA estimates associated with multiple DL beams of each n-gNB, and in addition, the direction-of-departure (DoD) information (if available) about the transmitted CSI-RS and/or SSB beams provided by each n-gNB.

109. SRS Configuration and UL Beam Report for UL TDOA Positioning

In addition to DL beam reporting, UL SRS beam sweeping may be used for uplink TOA (or RSTD and/or RTT) estimation at the n-gNB and at least one s-gNB. In order to facilitate UL SRS beam sweeping, the s-gNB and n-gNB(s) information may be used by the LMF for the SRS configuration with the UE based exchanged information of the DL beam report (see step 104a, 104b). The SRS configuration (104c) may contain information on the number of SRS resources per s-gNB and n-gNB as well as the time/frequency location and behavior of each SRS resource/SRS resource set. Note that each SRS resource of the SRS resource setting may be associated either with the s-gNB or the n-gNB.

The s-gNB may configure the UE with a SRS resource setting containing one or more SRS resources used for generating UL SRS beam-based TDOA estimation.

The s-gNB may configure the UE with a SRS setting containing one or more SRS beam-IDs of each uplink path component at the n-gNBs that may be reported to the s-gNB or the LMF. Hence, SRS beam-IDs of each uplink path component at the n-gNB(s) may be reported to the s-gNB and/or the LMF and the s-gNB may configure the UE with a SRS setting containing said one or more SRS beam-IDs.

Each SRS resource to be transmitted by the UE may be configured with the higher-layer parameter spatiaRelationInfo that instructs the UE to reuse the spatial Rx filter used for the reception of a specific DL beam (indexed by CRI or SSB-ID for a CSI-RS or SSB beam, respectively) associated with a n-gNB for a corresponding uplink Tx beam transmission with the n-gNB.

The parameter spatiaRelationInfo of a SRS resource may also be configured with a beam-ID corresponding to a received DL beam from the s-gNB for a corresponding uplink Tx beam transmission with the s-gNB.

A configured SRS resource set may be triggered by the s-gNB using the downlink control information (DCI), or by an activation command in the MAC layers control element (CE).

Based on the received UL SRS beams transmitted by the UE, each n-gNB may estimate a single or a set of TOAs which is/are associated with an UL SRS beam. The estimated TOA(s) along with the SRS beam-IDs and possibly an estimate of the direction-of-arrival (DoAs or DODs) of each path component associated to a TOA (or ToA) are reported to the s-gNB/LMF. A report to the LMF may contain the following values:

(SRS beam ID #1, ToA #1), . . . , (SRS beam ID #N, ToA #N)

or (SRS beam ID #1, DoA #1, ToA #1), . . . , (SRS beam ID #N, DoA #N, ToA #N)

or (SRS beam 10 #1, ToA_1 #1, . . . . ToA_K #1), . . . , (SRS beam ID #N, ToA_1 #N, . . . , ToA_K #N)

or

[SRS beam ID #1, (ToA_1 #1, DoA_1 #1), . . . , (ToA_K #1, DoA_K #1)], . . . , [SRS beam ID #N, (ToA_1 #N, DoA_1 #N), . . . , (ToA_K #N, DoA_K #N)]

The report on the estimated ToAs and DoAs provided by each n-gNB and the s-gNB is used at the LMF to estimate the UE's position. The s-gNB may also estimate the location of the target UE using the received measurement beam report received from the target UE. Hence, the embodiments herein cover both the case when the s-gNB performs the estimation of the location of the UE and when instead the LMF performs such estimation of the location of the UE. This is shown in FIG. 1 wherein block 109 is depicted both at the LMF side (dotted block) and at the s-gNB side and wherein the estimation/calculation of the location or position of the UE may be performed. Note that, in accordance with an embodiment herein, the estimation/calculation of the location of the UE may be performed only at the LMF residing in the core network, and/or in the radio access network, or both in the serving gNB residing in the radio access network and in the LMF (residing in the radio access network or/and in the core network).

In addition, the UE may use the DL beam report containing information on the DL ToAs and possibly DoDs for each received DL beam at the UE in combination with the UL ToAs and/or DoAs obtained by the UL beam report to estimate the UE position.

110 (not Shown in FIG. 1) UEs with Similar SSB Reporting

Assuming that certain UEs are configured following the steps (101-106), if other UEs report similar DL-RS in step 103, the LMF may identify the UE with the resource configurations and setting for the already allocated DL-RSs for another UE. The UE reports the RSRP or SINR and quality of the selected beams and the LMF may decide based on the report and required accuracy level if a set of the allocated resources may be used. Hence, the LMF may decide based on RSRP or SINR reports received from more than one UE, the PRS resources (beams) used from one or more gNBs.

Figure 3:
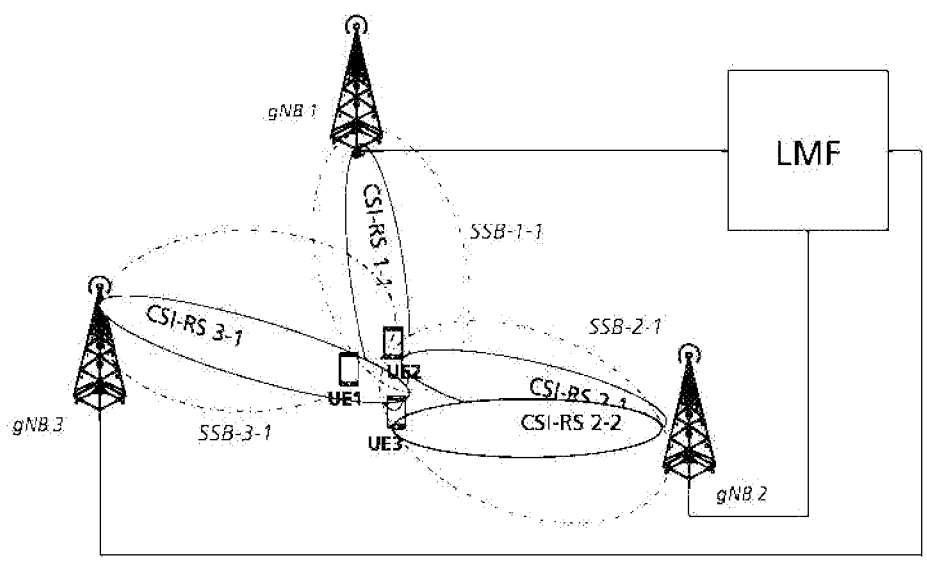
FIG. 3 illustrates an example of a network scenario wherein embodiments herein may be applied

According to some exemplary embodiments herein, the beam management procedure may be performed by the following steps with reference to FIG. 1 and FIG. 3:

1. Steps (101-103) may be performed similar to the above procedure;
2. The SSB Beam report for the target UE may be correlated with another positioning UE or set of UEs having allocated positioning (e.g. CSI-RS) resources;
3. The LMF may inform the target UE with the CSI-RS configuration for the n-gNBs allocated for a second UE;
4. Based on the UE report and desired positioning accuracy the LMF may decide to commonly use a set of CSI-RS for multiple UEs.

FIG. 3 illustrates a scenario wherein several UEs (UE1-UE3), several gNBs (gNB1-gNB3), a LMF, and wherein three Synchronization Signal Blocks (SSB-1-1-SSB 3-1) and three CSI-RS resources (CSI-RS 1-1-CSI-RS 3-1) are considered according to an exemplary embodiment.

According to FIG. 3, DL-RS similar reporting: UE1 had performed beam acquisition and refinement procedure, UE2 had a similar SSB report and the CSI-RS report with the other gNB match, UE3 reports that a set of the CSI-RS can be used.

It should be noted that in the "UE-assisted" mode as described above, the target UE may be configured to make measurements (like in some embodiments, on SSB and/or CSI-RS and/or any newly defined PRS (Positioning Reference Signal transmitted on the various beams etc.) and may report to a central function (e.g. the LMF) in the network, which central node may reside in the radio access network and/or in the core network. In this case, the final positioning result may be calculated in the network.

In a "UE-based" mode, the target UE may make the same measurements (or send the same RS in the uplink case, but may keep the measurement reports (made on its own) and may receive additional assistance data like locations of n-gNBs and or s-gNB that are needed to calculate positions. It may then calculate the final positioning result on its own (i.e. the target UE) and may additionally later report the positioning to other entities or network node(s) or server(s) or other UE(s).

The choice of a positioning architecture (UE-assisted mode or UE-based mode) is use-case dependent. However, since the diversity of use cases increases in 5G (NR), the embodiments herein may be employed in any appropriate and feasible case flexibly.

The proposed scheme of making NR-based beamformed measurements for positioning is in principle independent of the chosen architecture. Depending on the architecture, the final destination of measurement reports might be different (i.e. a network component like the LMF, or the UE keeping measurements on downlink measurements or receiving uplink measurement reports (e.g. made by gNBs on beamformed SRS) to do its own position calculation).

Figure 4:
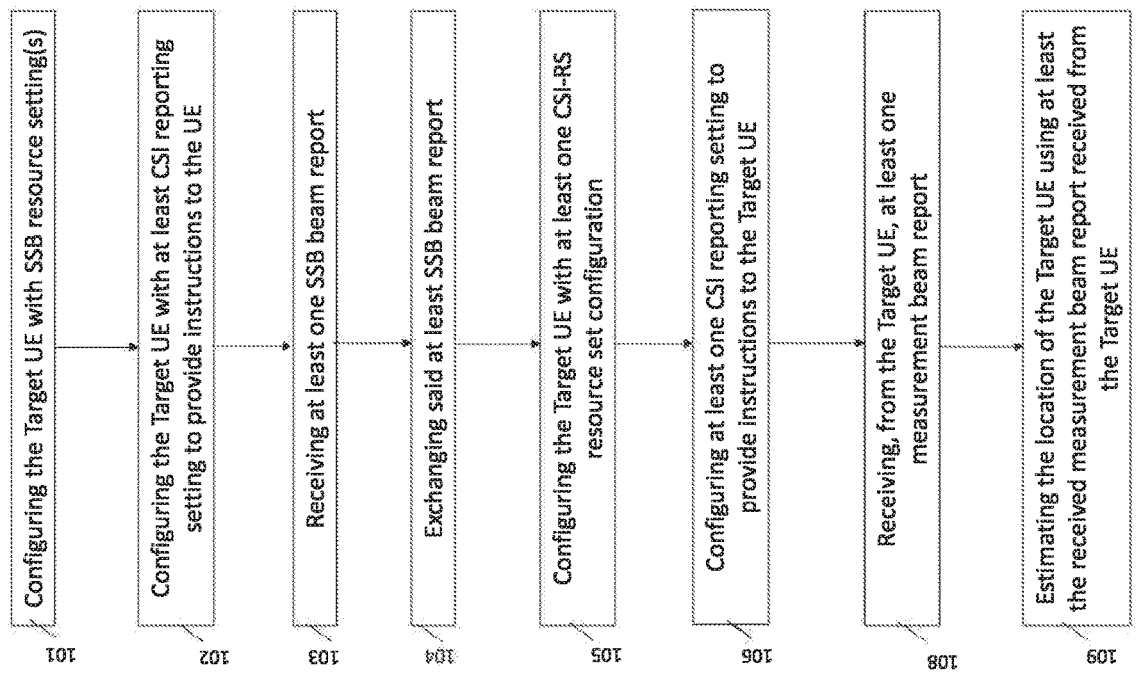
FIG. 4 illustrates a flowchart of a method performed by a network node according to some exemplary embodiments herein.

Referring to FIG. 4, there is illustrated a flowchart of a method performed by a radio network node according to some embodiments described above. Details will not be repeated and may instead be found in the description above. As previously described SSB is an example of a reference signal (RS). PRS is also an example of a reference signal (RS). Hence, in the method below, instead of SSB resource setting, RS resource setting may be used. Similarly, instead of SSB beam, a RS resource may be employed. Further, instead of CSI-RS, a PRS may be used.

The method comprises:
(101) configuring a target-UE with at least one synchronization signal block resource setting containing a configuration of a number of synchronization signal blocks or block sets associated with at least one n-gNB, wherein each configuration contains information on a time and a frequency location behavior of said least received synchronization signal block resource associated with a n-gNB, and wherein each synchronization signal block resource, SSB beam, is transmitted from an associated n-gNB employing beamforming, and received by the UE and/or s-gNB;
(102) configuring the UE with at least one Channel State Information, CSI, reporting setting to provide instructions to the UE on when and how to report, on said configured SSS beam associated with respective n-gNB; at least a measurement information beam report, SSB beam report;
(103) receiving at least one SSB beam report from the target UE;
(104) exchanging said at least one SSB beam report with at least one n-gNB and/or a LMF. In case the LMF is the coordinating unit or node, the method comprises the LMF informing at least one gNB with at least one resource configuration such as the PRS configuration;
(105) configuring the target UE with at least one CSI-RS resource set configuration;
(106) configuring at least one CSI reporting setting to provide instructions to the target UE on when to perform at least one beam measurement and at least one measurement on Time-Of-Arrival, TOA, parameter or Reference Signal Time Difference, RSTD, parameter or Round Trip Time, RTT, parameter of the configured CSI-RS and/or SS/PBCH block resources and how to report these parameters;
(108) receiving, from the target UE, at least one measurement beam report including at least one value of each identified beam-ID along with an associated signal strength/quality indicator and one or several TOA or RSTD or RTT estimates associated with each received DL beam; and (109) estimating the location of the target UE using at least the received measurement beam report received from the target UE.

Said measurement information includes CSI quantities comprising at least gNB-Index-ssb-Index-RSRP associated with a gNB; and/or gNB-Index-ssb-Index-SINR associated with the gNB, wherein RSRP stands for Reference Signals Received Power, and SINR stands for Signal to Interference Noise Ratio.

The method further comprising configuring the target UE with group-based or non-group-based beam reporting for reporting said measurement information of the received SSB beams from the different n-gNBs. Said at least one beam report includes at least a gNB identifier, a beam-identifier and a measure of the signal quality corresponding to a received DL beam associated with at least on configured SS/PBCH block resource or at least one CSI-RS resource at the UE. N out of K SSB beams reported may be associated with the same gNB (e.g., the same gNB index) and wherein the SSB beams reported may be grouped with respect to the gNB-Index they are associated with. N<K and N and K can take any suitable value and are design parameters. Exchanging said at least one SSB beam report with at least one n-gNB includes exchanging an SSB beam report associated with the strongest downlink beam having the highest RSRP or SINR. Exchanging said at least one SSB beam report with the LMF enables the LMF to use said information to assign beam pairs and time/frequency resources.

The method further comprising employing said at least one CSI resource to generate a set of DL CSI-RS beams, and wherein said CSI-RS resources are orthogonal or quasi-orthogonal for reducing interference at the UE caused by the different DL CSI-RS beams from said at least one n-gNB and or the s-gNB. The first TOA or RSTD or RTT estimate is associated with the strongest path component of the DL beam, the second estimate is associated with the second strongest path component of the DL beam and so no. The method further comprising using said at least one beam report provided by the target UE to estimate the target UE's location. The method further comprises configuring the UE with a Sounding Reference Signal, SRS resource setting containing one or more SRS resources used for generating UL SRS beam-based TDOA estimation. The estimated TOA(s) or DOA(s) along with the SRS beam-IDs of each uplink path component at the n-gNB(s) may be reported to the s-gNB or the LMF. According to an embodiment, each SRS resource is configured with a higher-layer parameter, instructing the UE to reuse a spatial receiver filter used for reception of a DL beam associated with a n-gNB for a corresponding uplink beam transmission with the n-gNB. As previously described, the LMF may receive from at least one n-gNB a report including one or more of an SRS beam-ID, a TOA estimate and a DOA estimate of each path component associated to a ToA. The method further comprises configuring the UE with multiple TOA reporting per DL beam and receiving from the UE a report including a set of TOA values relating to a first or strongest TOA value. The method further comprises configuring the UE to perform TOA measurements or received DL RS beams and configuring the UE to provide a beam report to the s-gNB or to the LMF. The LMF may decide, based on RSRP or SINR reports received from more than one UE, the PRS resources used from one or more gNBs.

Figure 5:
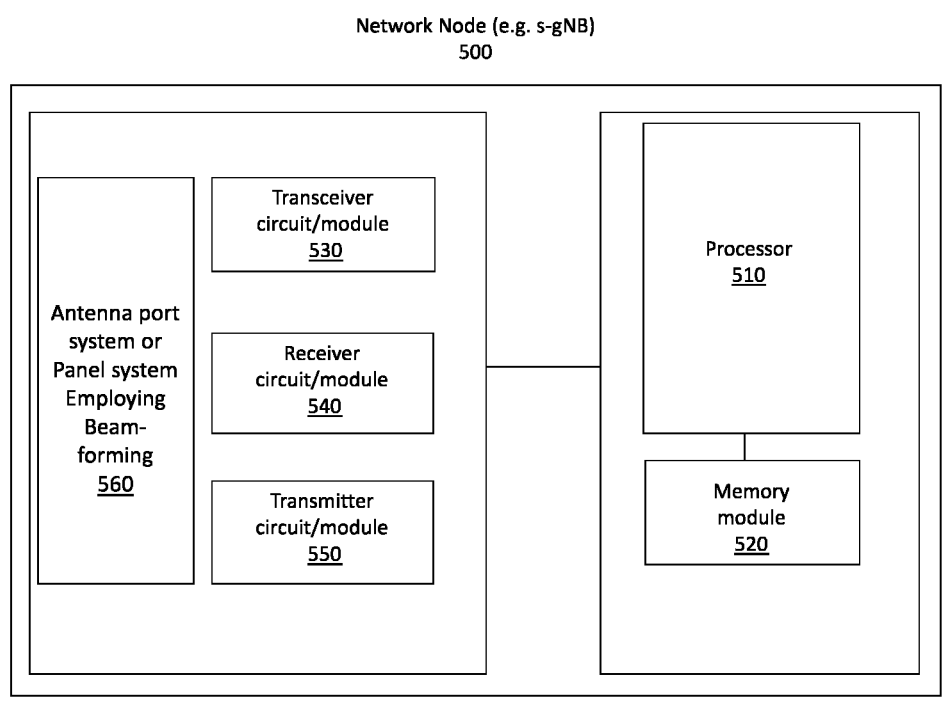
FIG. 5 is a block diagram depicting a network node according to exemplary embodiments herein.

In order to perform the previously described process or method steps related to the radio network node (e.g. a radio base station or gNB), some embodiments herein include a network node for beam management for DL and/or UL positioning measurements. As shown in FIG. 5, the network node 500 comprises a processor 510 or processing circuit or a processing module or a processor or means 510; a receiver circuit or receiver module 540; a transmitter circuit or transmitter module 550; a memory module 520 a transceiver circuit or transceiver module 530 which may include the transmitter circuit 550 and the receiver circuit 540. The network node 500 further comprises an antenna system 560 which includes antenna circuitry for transmitting and receiving signals to/from at least the UE. The antenna system employs beamforming as previously described.

The network node 500 may belong to any radio access technology including 2G, 3G, 4G or LTE, LTE-A, 5G, WLAN, and WiMax etc. that support beamforming technology.

The processing module/circuit 510 includes a processor, microprocessor, an application specific integrated circuit (ASIC), field programmable gate array (FPGA), or the like, and may be referred to as the "processor 510." The processor 510 controls the operation of the network node 500 and its components. Memory (circuit or module) 520 includes a random-access memory (RAM), a read only memory (ROM), and/or another type of memory to store data and instructions that may be used by processor 510. In general, it will be understood that the network node 500 in one or more embodiments includes fixed or programmed circuitry that is configured to carry out the operations in any of the embodiments disclosed herein.

In at least one such example, the network node 500 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein. Further, it will be appreciated that the network node 500 may comprise additional components not shown in FIG. 5.

As previously presented, the network node 500 is operative to:

configure the target UE with at least one synchronization signal block resource setting containing a configuration of a number of synchronization signal blocks or block sets associated with at least one n-gNB, wherein each configuration contains information on a time and a frequency location behavior of said least received synchronization signal block resource associated with a n-gNB, and wherein each synchronization signal block resource, SSB beam, is transmitted from an associated n-gNB employing beamforming, and received by the UE and/or s-gNB;

configure the UE with at least one Channel State Information, CSI, reporting setting to provide instructions to the UE on when and how to report, on said configured SSS beam associated with respective n-gNB; at least a measurement information beam report, SSB beam report;

receive at least one SSB beam report from the target UE;

exchange said at least one SSB beam report with at least one n-gNB and/or a Location Measurement Function, LMF;

configure the target UE with at least one CSI-RS resource set configuration;

configure at least one CSI reporting setting to provide instructions to the target UE on when to perform at least one beam measurement and at least one measurement on Time-Of-Arrival, TOA, parameter or Reference Signal Time Difference, RSTD, parameter or Round Trip Time, RTT, parameter of the configured CSI-RS and/or SS/PBCH block resources and how to report these parameters;

receive, from the target UE, at least one measurement beam report including at least one value of each identified beam-ID along with an associated signal strength/quality indicator and one or several TOA or RSTD or RTT estimates associated with each received DL beam; and estimate the location of the target UE using at least the received measurement beam report received from the target UE.

Additional details relating to the functionality or actions performed by the radio base station have already been disclosed.

There is also provided a computer program comprising instructions which when executed on at least one processor 510 of the network node, cause the processor 510 to carry out the method according to the subject matter herein.

Figure 6:
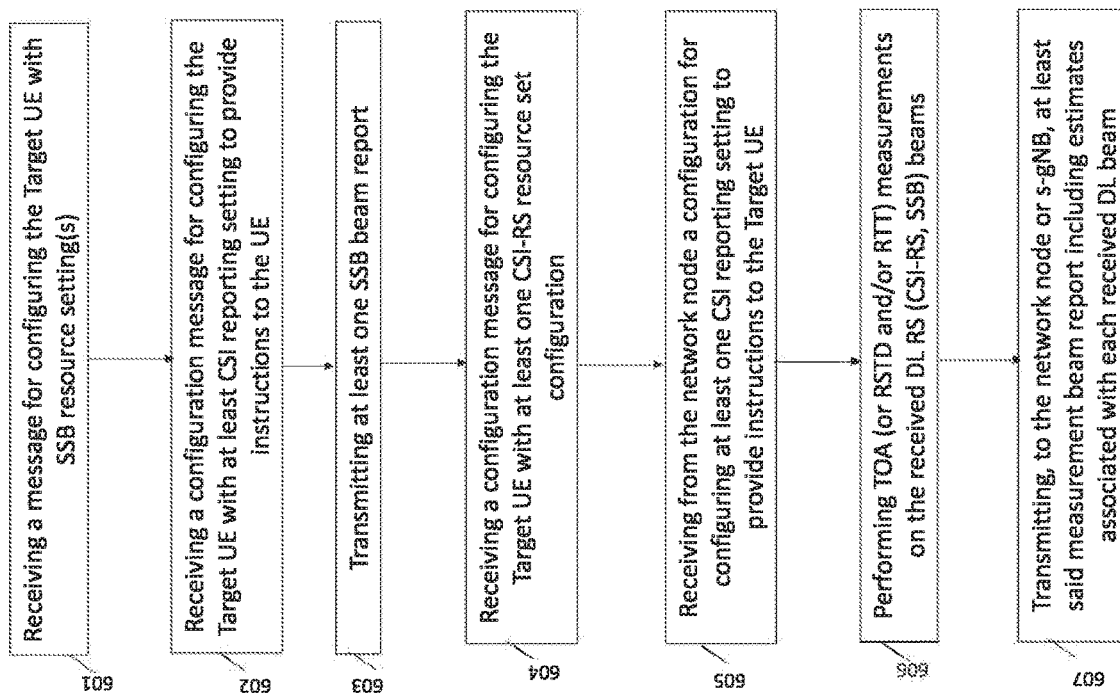
FIG. 6 illustrates a flowchart of a method performed by a UE according to some exemplary embodiments herein.

Referring to FIG. 6, there is illustrated a method performed by a UE (e.g. a target UE) according to some exemplary embodiments:

The method comprises:

(601) Receiving, from a network node a configuration message for configuring the target-UE with at least one synchronization signal block resource setting (or in general a RS resource setting) containing a configuration of a number of synchronization signal blocks or block sets or resource sets, associated with at least one n-gNB, wherein each configuration contains information on a time and a frequency location behavior of said least received synchronization signal block resource or RS resource associated with a n-gNB, and wherein each synchronization signal block resource, SSB beam or RS resources transmitted from an associated n-gNB employing beamforming, and received by the UE and/or s-gNB;

(602) receiving, from the network node, a configuration message for configuring the UE with at least one Channel State Information, CSI, reporting setting with instructions on when and how to report, on said configured SSS beam or RS resources associated with respective n-gNB; at least a measurement information beam report, SSB beam report;

(603) transmitting to the network node at least one SSB beam report or beam report; wherein said at least one SSB beam report or beam report may be exchanged between the s-gNB and at least one n-gNB (or gNB) and/or a Location Measurement Function, LMF;

(604) receiving, from the network node a configuration message for configuring the target UE with at least one CSI-RS (or PRS) resource set configuration;

(605) receiving from the network node a configuration for configuring target UE with at least one CSI reporting setting to provide instructions to the target UE on when to perform at least one beam measurement and at least one measurement on Time-Of-Arrival, TOA, parameter or Reference Signal Time Difference, RSTD, parameter or Round Trip Time, RTT, parameter of the configured CSI-RS (or PRS) and/or SS/PBCH block resources or RS resources and how to report these parameters;

(606) performing TOA (or RSTD and/or RTT) measurements on the received DL RS (CSI-RS, SSB, PRS) beams and providing at least one beam report to the s-gNB or the LMF; and (607) transmitting to the network node or s-gNB or the LMF at least said measurement beam report including at least one value of each identified beam-ID along with an associated signal strength/quality indicator and one or several TOA or RSTD or RTT estimates associated with each received DL beam.

Additional functions performed by the target UE has already been disclosed and need no repetition.

Figure 7:
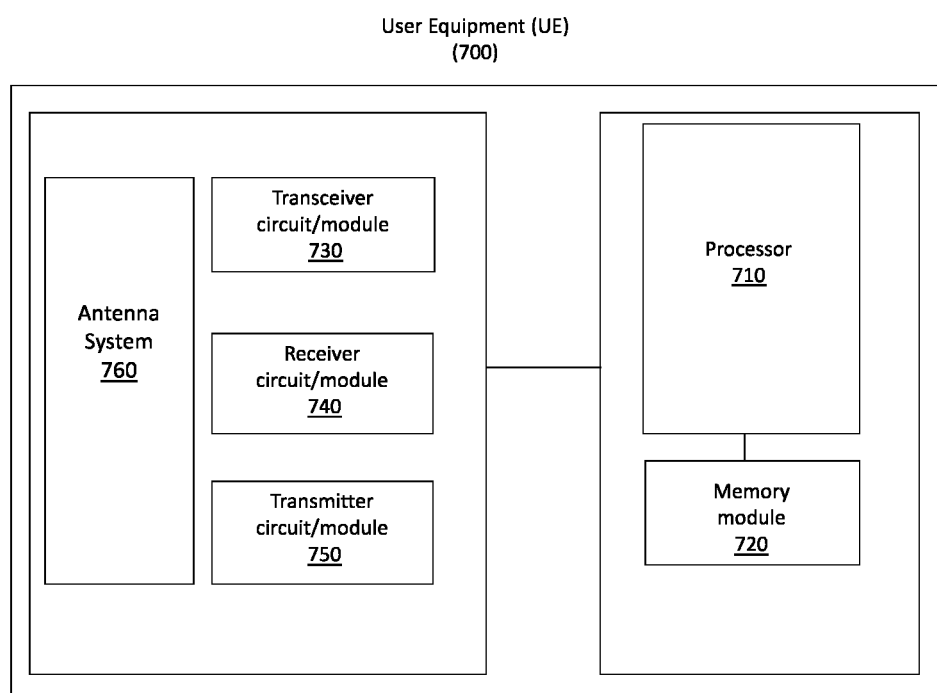
FIG. 7 is a block diagram depicting a UE according to exemplary embodiments herein.

In order to perform the previously described process or method steps related to the UE (e.g. target UE shown in FIG. 1), some embodiments herein include a UE 700 for beam management for DL and/or UL positioning measurements. As shown in FIG. 7, the UE 700 comprises a processor 710 or processing circuit or a processing module or a processor or means 710; a receiver circuit or receiver module 740; a transmitter circuit or transmitter module 770; a memory module 720 a transceiver circuit or transceiver module 730 which may include the transmitter circuit 770 and the receiver circuit 740. The UE 700 further comprises an antenna system 760 which includes antenna circuitry for transmitting and receiving signals to/from at least network nodes and other UEs etc. The antenna system employs beamforming as previously described.

The UE 700 may operate in any radio access technology including 2G, 3G, 4G or LTE, LTE-A, 5G, WLAN, and WiMax etc. that support beamforming technology.

The processing module/circuit 710 includes a processor, microprocessor, an application specific integrated circuit (ASIC), field programmable gate array (FPGA), or the like, and may be referred to as the "processor 710." The processor 710 controls the operation of the UE 700 and its components. Memory (circuit or module) 720 includes a random-access memory (RAM), a read only memory (ROM), and/or another type of memory to store data and instructions that may be used by processor 710. In general, it will be understood that the UE 700 in one or more embodiments includes fixed or programmed circuitry that is configured to carry out the operations in any of the embodiments disclosed herein.

In at least one such example, the UE 700 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein. Further, it will be appreciated that the UE 700 may comprise additional components not shown in FIG. 7.

The UE 700 (or target UE) is operative to:

Receive, from a network node (serving the UE or from any other network node e.g. the LMF server or node hosting the LMF) a configuration message for configuring the UE with at least one synchronization signal block resource setting containing a configuration of a number of synchronization signal blocks or block sets associated with at least one n-gNB, wherein each configuration contains information on a time and a frequency location behavior of said least received synchronization signal block resource associated with a n-gNB, and wherein each synchronization signal block resource, SSB beam, is transmitted from an associated n-gNB employing beamforming, and received by the UE and/or s-gNB;

receive, from the network node, a configuration message for configuring the UE with at least one Channel State Information, CSI, reporting setting to with instructions on when and how to report, on said configured SSS beam associated with respective n-gNB; at least a measurement information beam report, SSB beam report;

transmit to the network node at least one SSB beam report from the target UE; wherein said at least one SSB beam report is exchanged between the s-gNB and at least one n-gNB and/or a Location Measurement Function, LMF;

receive, from the network node a configuration message for configuring the target UE with at least one CSI-RS resource set configuration;

receive from the network node a configuration for configuring at least one CSI reporting setting to provide instructions to the target UE on when to perform at least one beam measurement and at least one measurement on Time-Of-Arrival, TOA, parameter or Reference Signal Time Difference, RSTD, parameter or Round Trip Time, RTT, parameter of the configured CSI-RS and/or SS/PBCH block resources and how to report these parameters;

perform TOA (or RSTD and/or RTT) measurements on the received DL RS (CSI-RS, SSB) beams and providing at least one beam report to the s-Gnb; and transmit to the network node or s-gNB at least said measurement beam report including at least one value of each identified beam-ID along with an associated signal strength/quality indicator and one or several TOA or RSTD or RTT estimates associated with each received DL beam.

Additional functions performed by the target UE have already been disclosed and need not be repeated.

There is also provided a computer program comprising instructions which when executed on at least one processor 710 of the UE, cause the at least said one processor 710 to carry out the method according to the subject-matter disclosed herein.

A carrier containing the computer program is also provided, wherein the carrier is one of a computer readable storage medium; an electronic signal, optical signal or a radio signal.

As evident from the detailed description, several advantages are achieved by the disclosed embodiments which include:

Introducing new useful schemes, for mobile networks employing beamforming, on how to combine positioning reference signal transmission in both downlink and uplink directions with all details necessary to integrate with beam management and beamforming (including signaling);

Configuring a (target or Source) UE with at least one synchronization resource block settings of at least one neighboring network node (n-gNB), the UE does not need to blindly detect the said resource block of said at least one n-gNB. Therefore, by exploiting the a priori knowledge of synchronization signal resource block(s) of each neighboring n-gNBs which are each involved in the method herein, the overall synchronization signal block detection complexity at the UE is reduced and the detection performance is improved; and also reducing the amount of signaling since the (target) UE knows when to perform the detection.

It should also be mentioned that the embodiments herein also provide a LMF which may include some of the functionalities of the network node 500. Hence embodiments herein provide a LMF (at the network node or at a server in the network or in any suitable node in the core network) and a method performed therein as previously described. As previously shown and described, calculation of the position information using TOA and/or DOD may be performed by the LMF (see dotted block 109). Also, as previously described, the target UE itself may perform the calculating of the its position and may additionally report the result to the other entities in the network.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, satellite communications, TV broadcasting etc. that may employ beamforming technology.

The invention claimed is:

1. A device comprising:
   a processor circuit and a memory,
   wherein memory comprises instructions executable by the processor circuit,
   wherein the processor circuit is arranged to configure a user equipment with at least one reference signal resource setting,
     wherein the at least one reference signal resource setting comprises a plurality of configurations,
     wherein each configuration is of a distinct one of a plurality of resource sets,
     wherein each resource set comprises at least one reference signal resource,
     wherein the at least one reference signal resource is associated with at least one network node,
     wherein each configuration comprises information on a time and a frequency location behavior of the at least one reference signal resource,
     wherein each reference signal resource is transmitted using beamforming,
     wherein each reference signal resource is received by the user equipment;
   wherein the processor circuit is arranged to configure the user equipment with at least one Channel State Information reporting setting so as to provide instructions to the user equipment on when and how to report,
     wherein the report is associated with the at least one reference signal,
     wherein the report comprises at least a measurement information beam report,
   wherein the processor circuit is arranged to inform at least one network node about at least one resource configuration, wherein the processor circuit is arranged to configure the user equipment with at least one Positioning Reference Signal resource configuration, wherein the processor circuit is arranged to configure at least one Channel State Information reporting setting to provide instructions to the user equipment on when to perform at least one beam measurement and at least one parameter measurement, wherein the processor circuit is arranged to receive at least one measurement beam report from the user equipment, wherein the measurement beam report comprises at least one value of each identified beam-ID along with an associated signal strength/quality indicator and at least one Time-Of-Arrival or Reference Signal Time Difference or Round Trip Time estimates associated with at least one beam, wherein the processor circuit is arranged to estimate the location of the user equipment using at least the measurement beam report, and wherein the processor circuit is arranged to configure the user equipment with multiple Time-Of-Arrival reporting for each beam and receive a Time-Of-Arrival report from the user equipment, and wherein the Time-Of-Arrival report comprises a plurality of Time-Of-Arrival values relating to a first or strongest Time-Of-Arrival value.

2. The device according to claim 1,
wherein the measurement information beam report comprises Channel State Information quantities,
wherein the Channel State Information quantities comprise an index,
wherein the index is associated with a network node.

3. The device according to claim 1,
wherein the processor circuit is arranged to configure the user equipment with group-based or non-group-based beam reporting,
wherein the group-based or non-group based beam reporting comprises the measurement information beam report of the reference signal resources.

4. The device according to claim 1,
wherein the at least one measurement information beam report comprises at least one of a network node identifier, a beam-identifier and a measure of the signal quality,
wherein the signal quality corresponds to the at least one beam associated with at least one configured SS/PBCH block resource.

5. The device according to claim 1,
wherein N out of K beams reported are associated with the same index,
wherein N is an integer greater than one,
wherein K is an integer greater than one,
wherein the beams reported may be grouped with respect to the index they are associated with,
wherein the index is a unique identifier associated with a network node.

6. The device according to claim 1,
wherein the processor circuit is arranged to exchange the at least one reference signal beam report with the at least one network node,
wherein the exchanging comprises exchanging a reference signal beam report associated with the strongest downlink beam having the highest Reference Signals Received Power or Signal to Interference Noise Ratio.

7. The device according to claim 1, wherein the at least one reference signal beam report enables a Location Management Function to use the information to assign beam pairs and time/frequency resources.

8. The device according to claim 4,
wherein the processor circuit is arranged to use the at least one Positioning Reference Signal resource to generate a plurality of Positioning Reference Signal beams,
wherein the at least one Positioning Reference Signal resource are orthogonal or quasi-orthogonal for reducing interference at the user equipment caused by the Positioning Reference Signal beams.

9. The device according to claim 1,
wherein the at least one Time-Of-Arrival or Reference Signal Time Difference or Round Trip Time estimates comprise a first estimate and a second estimate,
wherein the first estimate is associated with the strongest path component of the beam,
wherein the second estimate is associated with the second strongest path component of the beam.

10. The device according to claim 1,
wherein the processor circuit is arranged to use the at least one measurement information beam report to estimate the user equipment's location.

11. The device according to claim 1,
wherein the processor circuit is arranged to configure the user equipment with a Sounding Reference Signal resource setting,
wherein the Sounding Reference Signal resource setting comprises one or more Sounding Reference Signal resources.

12. The device according to claim 11,
wherein each Sounding Reference Signal resource is configured with a higher-layer parameter instructing the user equipment to reuse a spatial receiver filter,
wherein the spatial receiver filter is used for reception of a beam associated with a first network node for a corresponding uplink beam transmission with the first network node.

13. The device according to claim 12,
wherein the processor circuit is arranged to receive further comprising receiving a first report,
wherein the first report comprises one or more of an Sounding Reference Signal beam ID, a first Time-Of-Arrival estimate and a Direction-of-Arrival estimate of each path component associated with the first Time-Of-Arrival.

14. The device according to claim 1,
wherein the processor circuit is arranged to configure the user equipment to perform Time-Of-Arrival measurements on reference signal beams; and
wherein the processor circuit is arranged to configure the user equipment to provide the measurement information beam report to the at least one network node or to the Location Management Function.

15. The device according to claim 1, wherein the processor circuit is arranged to decide, based on Reference Signals Received Power or Signal to Interference Noise Ratio reports received from more than one user equipment, the at least one Positioning Reference Signal resource used from one or more network nodes.

16. The device according to claim 1, wherein the processor circuit is arranged to configure at least one Channel State Information reporting setting to provide instructions to the target user equipment on when to perform at least one parameter measurement on Time-Of-Arrival parameter or Reference Signal Time Difference parameter or Round Trip Time parameter of the configured Positioning Reference Signal and/or reference signal resources.

17. The device according to claim 1,
wherein the measurement information beam report comprises Channel State Information quantities,
wherein the Channel State Information quantities comprise an index,
wherein the index is associated with a gNB-Index-RS-Index-SINR associated with the network node.

18. The device according to claim 1,
wherein the at least one measurement information beam report comprises at least one of a network node identifier, a beam-identifier and a measure of the signal quality,
wherein the signal quality corresponds to at least one Positioning Reference Signal resource at the user equipment.

19. A target User Equipment comprising:
a processor circuit and a memory, the memory comprising instructions executable by the processor circuit,
wherein the processor circuit is arranged to receive a configuration message from a network node,
  wherein the configuration message is arranged to configure the user equipment with at least one reference signal resource setting,
  wherein the at least one reference signal resource setting comprises a configuration of a plurality of resource sets,
  wherein each resource set comprises at least one reference signal resource,
  wherein the at least one reference signal resource is associated with at least one network node,
  wherein each configuration comprises information on a time and a frequency location behavior of the at least one reference signal resource,
  wherein each reference signal resource is transmitted from an associated network node,
wherein the processor circuit is arranged to receive a Sounding Reference Signal resource setting,
  wherein the Sounding Reference Signal resource setting comprises at least one Sounding Reference Signal resources and time/frequency location and behavior of each Sounding Reference Signal resource/Sounding Reference Signal resource set used for generating uplink Sounding Reference Signal beam-based Time Difference Of Arrival estimation,
wherein the processor circuit is arranged to transmit the Sounding Reference Signal resources or the Sounding Reference Signal beams to the network node,
wherein the processor circuit is arranged to receive a configuration from the network node,
wherein the configuration comprises multiple Time-Of-Arrival reporting for at least one beam,
wherein the processor circuit is arranged to transmit a report to the network node and,
wherein the report comprises a set of Time-Of-Arrival values relating to a first or strongest Time-Of-Arrival value.

20. The device according to claim 19,
wherein a measurement information beam report comprises Channel State Information quantities,
wherein the Channel State Information quantities comprise an index,
wherein the index is associated with a network node.

21. The device according to claim 19,
wherein the processor circuit is arranged to configure the user equipment with group-based or non-group-based beam reporting,
wherein the group-based or non-group based beam reporting comprises a measurement information beam report of the reference signal resources.

22. The device according to claim 19,
wherein at least one measurement information beam report comprises at least one of a network node identifier, a beam-identifier and a measure of the signal quality,
wherein the signal quality corresponds to the at least one beam associated with at least one configured SS/PBCH block resource.

23. The device according to claim 19,
wherein N out of K beams reported are associated with the same index,
wherein N is an integer greater than one,
wherein K is an integer greater than one,
wherein the beams reported may be grouped with respect to the index they are associated with,
wherein the index is a unique identifier associated with a network node.

24. The device according to claim 19,
wherein the processor circuit is arranged to exchange the at least one reference signal beam report with the at least one network node,
wherein the exchanging comprises exchanging a reference signal beam report associated with the strongest downlink beam having the highest Reference Signals Received Power or Signal to Interference Noise Ratio.

25. The device according to claim 19, wherein the at least one reference signal beam report enables a Location Management Function to use the information to assign beam pairs and time/frequency resources.

26. The device according to claim 22,
wherein the processor circuit is arranged to use the at least one Positioning Reference Signal resource to generate a plurality of Positioning Reference Signal beams,
wherein the at least one Positioning Reference Signal resource are orthogonal or quasi-orthogonal for reducing interference at the user equipment caused by the Positioning Reference Signal beams.

27. The device according to claim 19,
wherein the at least one Time-Of-Arrival or Reference Signal Time Difference or Round Trip Time estimates comprise a first estimate and a second estimate,
wherein the first estimate is associated with the strongest path component of the beam,
wherein the second estimate is associated with the second strongest path component of the beam.

28. The device according to claim 19,
wherein the processor circuit is arranged to use at least one measurement information beam report to estimate the user equipment's location.

29. The device according to claim 1,
wherein the processor circuit is arranged to configure the user equipment with a Sounding Reference Signal resource setting,
wherein the Sounding Reference Signal resource setting comprises one or more Sounding Reference Signal resources.

30. The device according to claim 29,
wherein each Sounding Reference Signal resource is configured with a higher-layer parameter instructing the user equipment to reuse a spatial receiver filter,
wherein the spatial receiver filter is used for reception of a beam associated with a first network node for a corresponding uplink beam transmission with the first network node.

31. The device according to claim 30,
wherein the processor circuit is arranged to receive further comprising receiving a first report,
wherein the first report comprises one or more of an Sounding Reference Signal beam ID, a first Time-Of-Arrival estimate and a Direction-of-Arrival estimate of each path component associated with the first Time-Of-Arrival.

32. The device according to claim 19,
wherein the processor circuit is arranged to configure the user equipment to perform Time-Of-Arrival measurements on reference signal beams; and
wherein the processor circuit is arranged to configure the user equipment to provide a measurement information beam report to the at least one network node or to the Location Management Function.

33. The device according to claim 19, wherein the processor circuit is arranged to decide, based on Reference Signals Received Power or Signal to Interference Noise Ratio reports received from more than one user equipment, the at least one Positioning Reference Signal resource used from one or more network nodes.

34. The device according to claim 19, wherein the processor circuit is arranged to configure at least one Channel State Information reporting setting to provide instructions to the target user equipment on when to perform at least one parameter measurement on Time-Of-Arrival parameter or Reference Signal Time Difference parameter or Round Trip Time parameter of the configured Positioning Reference Signal and/or reference signal resources.

35. The device according to claim 19,
wherein a measurement information beam report comprises Channel State Information quantities,
wherein the Channel State Information quantities comprise an index,
wherein the index is associated with a gNB-Index-RS-Index-SINR associated with the network node.

36. The device according to claim 19,
wherein at least one measurement information beam report comprises at least one of a network node identifier, a beam-identifier and a measure of the signal quality,
wherein the signal quality corresponds to at least one Positioning Reference Signal resource at the user equipment.

37. A User Equipment comprising:
a processor circuit and a memory, the memory comprising instructions executable by the processor circuit,
wherein the processor circuit is arranged to receive a configuration message from a network node,
wherein the configuration message is arranged to configure the user equipment with at least one reference signal resource setting,
wherein the at least one reference signal resource setting comprises a configuration of a plurality of resource sets,
wherein each resource set comprises at least one reference signal resource,
wherein the at least one reference signal resource is associated with at least one network node,
wherein each configuration comprises information on a time and a frequency location behavior of the at least one reference signal resource,
wherein each reference signal resource is transmitted from an associated network node,
wherein the processor circuit is arranged to receive a Sounding Reference Signal resource setting,
wherein the Sounding Reference Signal resource setting comprises at least one Sounding Reference Signal resources and time/frequency location and behavior of each Sounding Reference Signal resource/Sounding Reference Signal resource set used for generating uplink Sounding Reference Signal beam-based Time Difference Of Arrival estimation,
wherein the processor circuit is arranged to transmit the Sounding Reference Signal resources or the Sounding Reference Signal beams to the network node,
wherein the processor circuit is arranged to receive a configuration from the network node,
wherein the processor circuit is arranged to configure the user equipment with group-based or non-group-based beam reporting and,
wherein the processor circuit is arranged to transmit a report to the network node.

38. The User Equipment of claim 37, wherein the report contains an indication of whether the report is made under Line-of-Sight or Non-Line-of-Sight conditions.

39. A User Equipment comprising:
a processor circuit and a memory, the memory comprising instructions executable by the processor circuit,
wherein the processor circuit is arranged to receive a configuration message from a network node,
wherein the configuration message is arranged to configure the user equipment with at least one reference signal resource setting,
wherein the at least one reference signal resource setting comprises a configuration of a plurality of resource sets,
wherein each resource set comprises at least one reference signal resource,
wherein the at least one reference signal resource is associated with at least one network node,
wherein each configuration comprises information on a time and a frequency location behavior of the at least one reference signal resource,
wherein each reference signal resource is transmitted from an associated network node,
wherein the processor circuit is arranged to receive a Sounding Reference Signal resource setting,
wherein the Sounding Reference Signal resource setting comprises at least one Sounding Reference Signal resources and time/frequency location and behavior of each Sounding Reference Signal resource/Sounding Reference Signal resource set used for generating uplink Sounding Reference Signal beam-based Time Difference Of Arrival estimation,
wherein the processor circuit is arranged to transmit the Sounding Reference Signal resources or the Sounding Reference Signal beams to the network node,
wherein the processor circuit is arranged to receive a configuration from the network node,
wherein the processor circuit is arranged to transmit a report to the network node and,
wherein the report contains an indication of whether the report is made under Line-of-Sight or Non-Line-of-Sight conditions.

* * * * *